US008728374B1

(12) United States Patent
Hancock et al.

(10) Patent No.: US 8,728,374 B1
(45) Date of Patent: May 20, 2014

(54) METHOD OF MANUFACTURING A FOUNDATION WALL PANEL

(75) Inventors: Robert Hancock, Lafayette, IN (US); Wenping Zhao, Glastonbury, CT (US)

(73) Assignee: Crane Composites Inc., Channahon, IL (US)

(*) Notice: Subject to any disclaimer, the term of this patent is extended or adjusted under 35 U.S.C. 154(b) by 0 days.

(21) Appl. No.: 13/565,381

(22) Filed: Aug. 2, 2012

Related U.S. Application Data

(60) Provisional application No. 61/514,376, filed on Aug. 2, 2011.

(51) Int. Cl.
*B32B 37/00* (2006.01)

(52) U.S. Cl.
USPC ........... 264/261; 264/510; 264/316; 264/257; 264/255; 427/294

(58) Field of Classification Search
USPC ............... 52/309.1, 309.14, 309.15, 309.16; 264/510, 255, 261, 257, 316; 427/294; 428/313.5; 156/285, 287; 416/229 R
See application file for complete search history.

(56) References Cited

U.S. PATENT DOCUMENTS

| | | | | |
|---|---|---|---|---|
| 3,982,874 | A * | 9/1976 | Nobbe | 425/424 |
| 4,201,823 | A * | 5/1980 | Russell | 428/194 |
| 4,353,947 | A * | 10/1982 | Northcutt | 428/116 |
| 4,902,215 | A | 2/1990 | Seemann, III | 425/406 |
| 5,024,664 | A | 6/1991 | Mitchell | 604/143 |
| 5,030,488 | A * | 7/1991 | Sobolev | 428/35.9 |
| 5,219,629 | A * | 6/1993 | Sobolev | 428/35.9 |
| 5,344,700 | A * | 9/1994 | McGath et al. | 428/304.4 |
| 5,773,121 | A * | 6/1998 | Meteer et al. | 428/117 |
| 5,958,325 | A | 9/1999 | Seemann, III et al. | 264/510 |
| 6,081,955 | A * | 7/2000 | Dumlao et al. | 14/73 |
| 6,110,575 | A * | 8/2000 | Haga | 428/294.7 |
| 6,755,633 | B2 | 6/2004 | Miller | 425/64 |
| 7,060,156 | B2 | 6/2006 | Mack et al. | 156/285 |
| 7,112,372 | B2 * | 9/2006 | Blair et al. | 428/626 |
| 7,118,699 | B2 | 10/2006 | Lauersdorf et al. | 264/255 |
| 7,198,471 | B2 | 4/2007 | Gunneskov et al. | 416/229 |
| 7,255,822 | B2 | 8/2007 | Bledsoe et al. | 264/261 |
| 7,300,894 | B2 * | 11/2007 | Goodell et al. | 442/242 |
| 7,413,694 | B2 | 8/2008 | Waldrop, III et al. | 264/257 |
| 7,461,453 | B1 | 12/2008 | Weerth | 29/897.1 |
| 7,503,752 | B2 | 3/2009 | Gunneskov et al. | 416/229 |
| 7,578,534 | B2 | 8/2009 | Wuerfel, III | 296/24.35 |
| 7,585,448 | B2 | 9/2009 | Hanks et al. | 264/316 |
| 7,588,800 | B2 | 9/2009 | Crump | 427/294 |

(Continued)

*Primary Examiner* — Chi Q Nguyen
(74) *Attorney, Agent, or Firm* — Fitzpatrick, Cella, Harper & Scinto

(57) ABSTRACT

A panel for use in a foundation or above-grade may be made with studs for strength, and for attachment to an interior wall. The composite panel has two outer facing sheets, and a core. Studs are provided on one of the outer facing sheets. The manufacturing process involves forming the panel on a mold by laying down a gel coat (optional), a lower facing sheet (used instead of, or with, the gel coat), the core piece(s), and the top facing layer. This can be done by a lamination process, or preferably is done by laying down fibrous material for the facing sheet(s) and vacuum-infusing it with resin, and curing the panel. The core pieces may either be pre-made, or (if infusion is used) may themselves be made in this process, by infusing them with the resin as well. The studs are preferably of galvanized steel and are secured by means of an adhesive.

14 Claims, 3 Drawing Sheets

(56) References Cited

U.S. PATENT DOCUMENTS

| | | | |
|---|---|---|---|
| 7,682,478 B1 | 3/2010 | Manlove et al. | 156/285 |
| 7,926,233 B2 | 4/2011 | Schiffmann et al. | 52/293.1 |
| 8,012,301 B2 * | 9/2011 | Schiffmann et al. | 156/307.1 |
| 8,522,509 B2 * | 9/2013 | Tracy et al. | 52/746.1 |
| 8,539,727 B2 * | 9/2013 | Lui | 52/384 |
| 2001/0008168 A1 | 7/2001 | Loza et al. | 156/278 |
| 2010/0040860 A1 | 2/2010 | Ma et al. | 428/304.4 |

* cited by examiner

METHOD OF MANUFACTURING A FOUNDATION WALL PANEL

BACKGROUND OF THE INVENTION

The present invention relates to panels for use in construction, and more particularly to composite panels for use in the construction of a house, other building or other structure.

Poured concrete and concrete blocks are used extremely widely in construction, for example as materials for the foundations and/or walls of houses, other buildings and other types of structures. Where concrete is used, it traditionally is poured at the building site, into forms built of wood or plywood on site, and removed after the concrete has set. This approach is labor-intensive, and the pouring can be done only when proper weather conditions exist. Accordingly, efforts have been made to reduce the amount of concrete required, or to reduce the amount of concrete that needs to be poured on-site.

One approach has been to use pre-cast concrete elements, cast at a plant, transported to the construction site after they have set, and put in place by a crane. Another approach has involved re-usable forms, for example of aluminum, that can be assembled at the construction site relatively quickly, and removed afterward for re-use.

Concrete blocks avoid the need for forms, and do not require a crane for installation, but do require a significant amount of labor to put in place.

Thus, while concrete and concrete blocks offer the benefit of being easy to obtain, and of being extremely well understood materials, they do suffer from some disadvantages. In addition, both poured concrete and concrete blocks are poor thermal insulators. This means that the space enclosed by a poured concrete or concrete block construction must be provided with insulation, unless the local climate makes it acceptable for that space to remain at or near the ambient outside temperature at all times. This consideration has led to the development of insulating concrete forms (ICFs), which are installed at the construction site, and once the concrete has been poured and set, are left in place as permanent building insulation. (ICFs are also used for floors and roofs.) These forms may be designed to interlock, to avoid the need for additional materials or tools to secure them together. Materials of which ICFs are made include polystyrene foam, polyurethane foam, cement-bonded wood fiber and cement-bonded polystyrene beads. The ICFs may serve a number of functions, including thermal and acoustic insulation, to provide space for electrical conduits and plumbing, and to provide backing for gypsum boards inside, or brick or the like outside.

Work has also been done to provide composite construction materials and elements. One example is shown in U.S. Pat. No. 7,926,233. A construction material of this kind may provide numerous benefits, including adequate strength, good thermal insulation characteristics, resistance to moisture and wetness, low susceptibility to leaks, and no susceptibility to corrosion. They may be provided in the form of modular elements, which promotes ease of assembly at the building site.

Nonetheless, some of the materials that may be used in making such construction elements are relatively expensive. For example, the materials may include plastic foam, resin, fiberglass-reinforced plastic, filler, and catalyst to promote the chemical reactions that are required to produce the finished construction element. And while one attraction of using composites is the ability to produce the construction elements in numerous shapes, it is also the case that a complex shape tends to require a complex, and hence expensive, mold. For these reasons the present inventors have considered ways to manufacture composite panels such that the product has the characteristics that make such panels attractive for use in construction, in a simpler fashion, and at a lower cost, than is conventionally possible.

As an example, a panel for use in a foundation or above-grade wall may advantageously be made with studs for adequate strength, and for use in attaching an interior wall if desired. In the mentioned patent a method is provided for producing such a panel, having integral studs, of composite materials. While the panel itself (that is, the element minus the studs) has a simple shape, the complete product does not. If the studs are formed extending outward from the panel, the overall shape is now quite complex from the viewpoint of making a mold with the proper shape in which the product can be made.

SUMMARY OF THE INVENTION

The method disclosed herein is for a composite panel suitable for use in constructing a building foundation. The panel has two outer facing sheets, of fiber-reinforced polyester (FRP) preferably (or one of gel coat if desired), and a core made of composite materials such as foam, optionally with internal reinforcement structures. The finished panel includes studs secured to one of the outer facing sheets, typically aligned parallel to each other at a regular pitch. The studs are preferably of galvanized steel and are secured by means of an adhesive.

The manufacturing process involves forming the panel on a mold by laying down the gel coat (if used), the lower facing sheet (if used instead of, or with the gel coat), the core piece(s), and the top facing layer. This can be done by a lamination process, or preferably is done by laying down fibrous material for the facing sheet(s) and vacuum-infusing it with resin, and curing the panel. The core pieces may either be pre-made, or (if infusion is used) may themselves be made in this process, by infusing them with the resin as well.

DETAILED DESCRIPTION OF THE PREFERRED EMBODIMENTS

Figure 4:
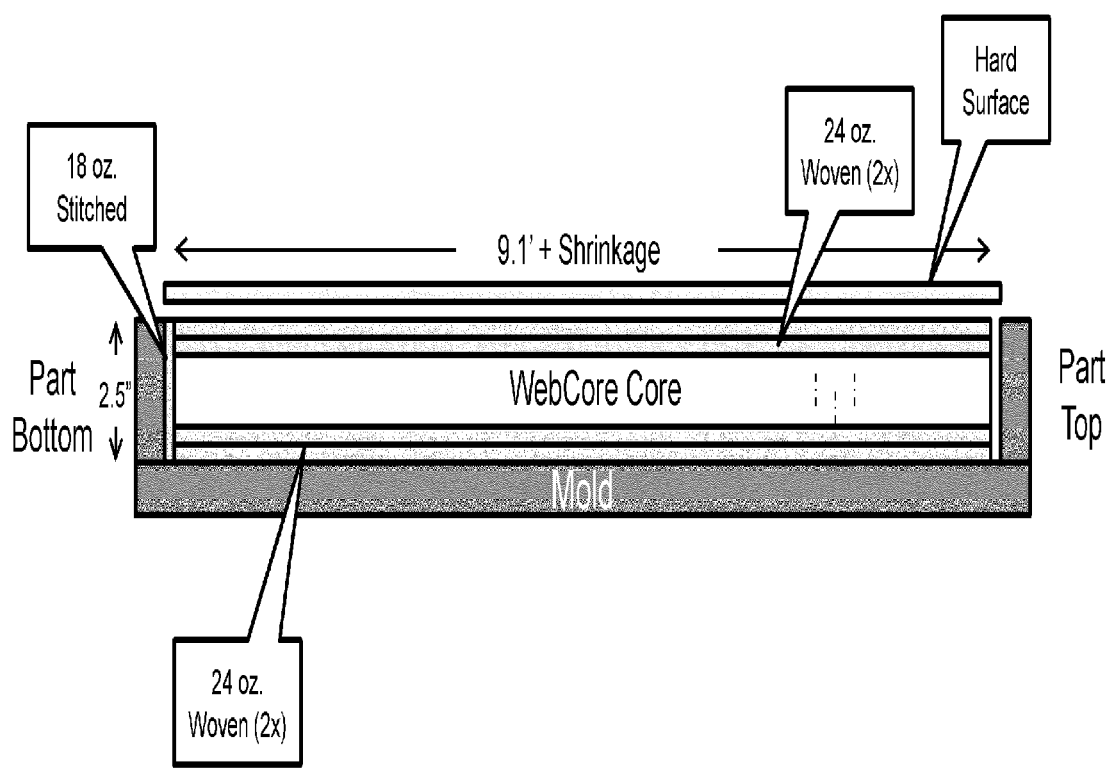
FIG. 4 is a sectional view taken from section lines 4-4 in FIG. 3 illustrating the layers of a panel in a mold.

In one embodiment, shown in FIG. 4, two plies of woven glass fabric are placed in the mold, with a commercially-available core on them, and an additional two plies of the same fabric on the core. Suitable resin and catalyst as needed are applied to the layers one by one as the layers are placed in the mold, and a flat surface is placed on top before bagging for vacuum curing. Equipment for vacuum curing and the techniques of such process are well known, and examples are shown and described in, for example, commonly-assigned U.S. Pat. Nos. 6,755,633 and 7,255,822, application Ser. No. 12/344,999, filed Dec. 29, 2008, and application Ser. No. 13/037,523, filed Mar. 1, 2011, the entire disclosures of which are incorporated herein by reference.

Figure 2:
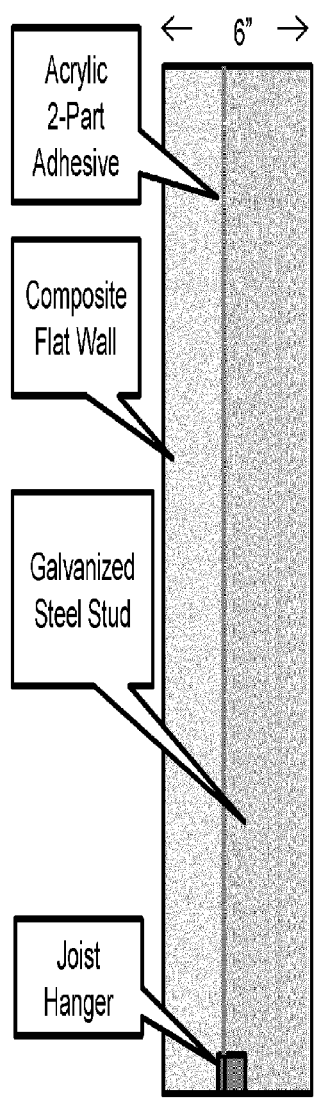
FIG. 2 is a side view of the panel of FIG. 1.
Figure 1:
FIG. 1 is a view of a portion of a finished panel.
Figure 3:
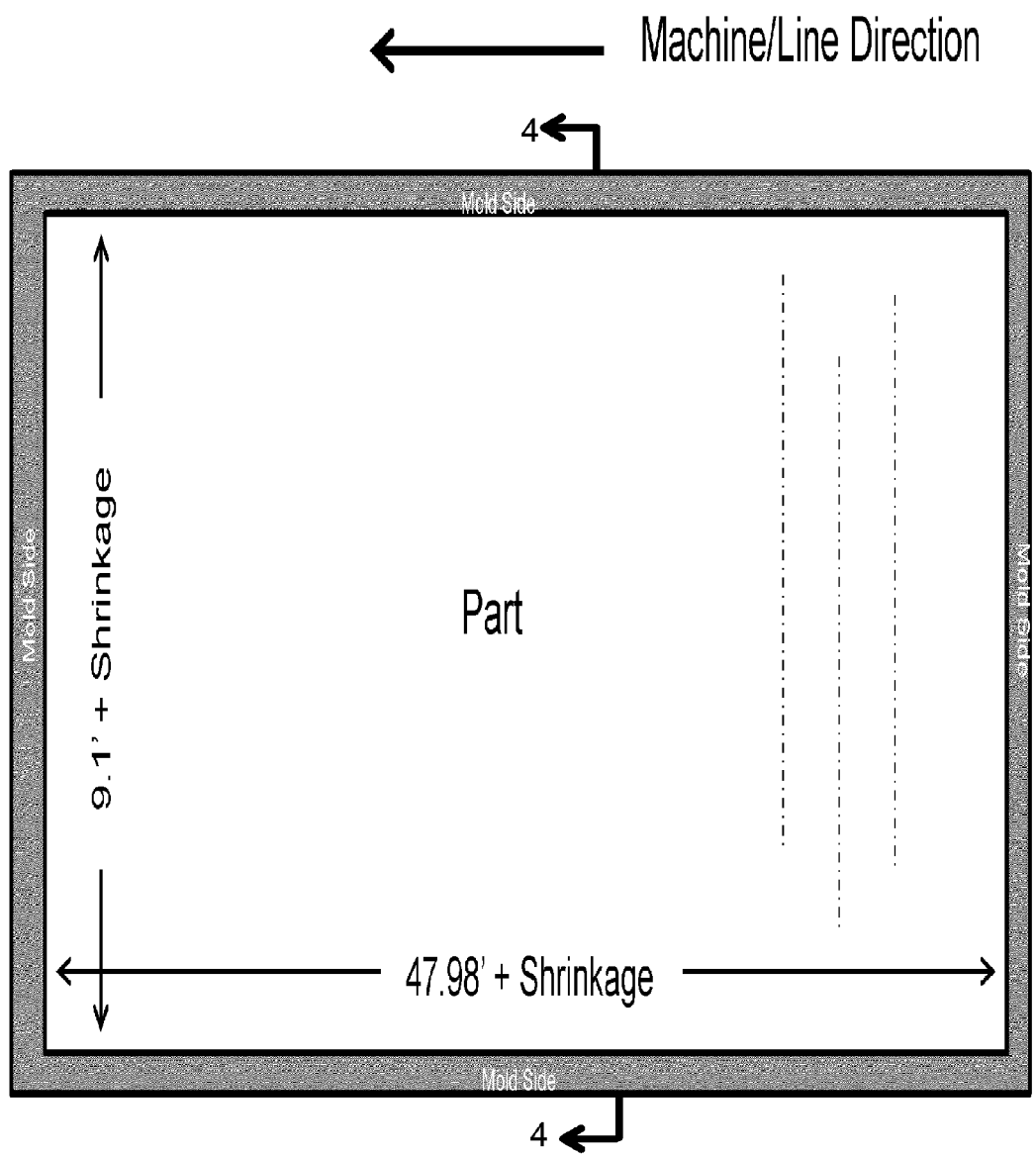
FIG. 3 is a top view illustrating a portion of a manufacturing line on which such panels are made.

After the resulting product has cooled, been removed from the vacuum bag and been cut to size if necessary, steel studs are secured to it with a two-part acrylic adhesive. The studs may be provided with joist hangars, as shown in FIGS. 1 and 2, to stabilize the stud during assembly, and for anchorage to the floor or the building or other structure in which the panel is ultimately incorporated.

This process may employ either stationary molds or molds that are moved along the manufacturing line, and that each accommodate a single panel, or may employ a continuous mold, in which case the panels are cut apart (either before or after the studs are affixed). Also, as stated, the core may be pre-made, or may be formed in the mold, by placement of a suitable material where the core layer is to be, infusing that material with resin and any other desired or needed catalyst or filler, and cured as the other layers are cured.

Again, it is within the scope of the invention for one or more of the layers other than the core to be pre-made and simply put in the proper place, with other layers also being pre-made, or being infused and cured, and with additional layers of resin or adhesive to aid in bonding the layers together, as desired.

Also, the first ply of glass fabric may be preceded (or replaced) by a gel coat layer on the mold, which may be cured before the placement of the next layer of material.

It has been found that a wall panel of about 9 feet by 48 feet, made using this method, having a thickness of 2.5 inches, provides a maximum deflection of only 0.45 inch under a transverse tapered load of 11,000 lbs. (It will be understood by those skilled in the art that the corresponding maximum deflection of a smaller or larger panel under such a load will be changed accordingly.) The panel, which may be made in about two hours per piece (that is, per panel) from loading of the mold through cure, provides thermal insulation of at least R10, the minimum set by the International Building Code. The panel may be made using standard resins for FRP panels, opaque pre-pigment, and with or without filler. The steel studs provide adequate strength for transport, and because the overall product is relatively thin (the studs add about 3.5 inches to the total thickness), the transport costs also are reduced.

This process and panel design result in faster and cheaper manufacture. In particular, comparing this method with one that produces a composite panel with composite studs as described above, the present method eliminates the need for cutting, grooving and wrapping foam for the studs (whether manually, or automatically or semi-automatically), and replaces the relatively expensive materials for composite studs with less-expensive galvanized steel and adhesive. The much simpler shape also means that a simpler, and less expensive, mold is used, and that the effort that would be involved in inserting, positioning and loading all the pieces into the mold is correspondingly simplified as well.

What is claimed is:

1. A method of manufacturing a panel, comprising:
   providing a mold having a surface on which the panel is laid down;
   laying down a material on the surface for an outer facing sheet;
   locating a core piece on the material of the outer facing sheet; wherein the core piece is infused with the resin and cured;
   forming a top facing sheet on the core piece; and
   attaching studs to an exterior surface of the panel by attaching the studs to the outer facing sheet, wherein said attaching step is performed after cooling and cutting to size of the panel.

2. A method according to claim 1, wherein said step of laying down comprises laying down a layer of gel coat.

3. A method according to claim 1, further comprising laying down a composite layer on the gel coat layer.

4. A method according to claim 1, wherein said step of locating comprises laying down several core pieces on the first outer facing sheet.

5. A method according to claim 1, wherein said laying down, locating and forming steps are performed by a lamination process.

6. A method according to claim 1, wherein said laying down, locating and forming steps include placing fibrous material for one or more layers, infusing the fibrous material with resin, and curing the panel.

7. A method according to claim 6, wherein said infusing of the fibrous material with resin is performed busing vacuum infusing.

8. A method according to claim 1, wherein at least one core piece is pre-made.

9. A method according to claim 1, wherein said steps are performed to produce the panel with a thickness of about 2.5 inches.

10. A method according to claim 9, wherein said steps are performed to produce the panel to have mechanical characteristics equivalent to showing a maximum deflection of less than about 0.50 inch under a transverse tapered load of 11,000 lbs for a panel of 9 feet by 48 feet.

11. A panel manufactured using the method of claim 1.

12. A method according to claim 1, wherein the studs are galvanized steel.

13. A method according to claim 1, wherein the studs are secured using an adhesive.

14. A method according to claim 1, wherein the studs attached in said attaching step have joist hangers.

* * * * *